United States Patent [19]
Löbert et al.

[11] Patent Number: 4,750,693
[45] Date of Patent: Jun. 14, 1988

[54] DEVICE FOR REDUCING THE FRICTIONAL DRAG OF MOVING BODIES

[75] Inventors: Gerhard Löbert, Baldham; Oskar Bschorr, Munich; Hans Spies, Pfaffenhofen, all of Fed. Rep. of Germany

[73] Assignee: Messerschmitt-Bölkow-Blohm GmbH, Munich, Del.X

[21] Appl. No.: 893,193

[22] Filed: Aug. 5, 1986

[30] Foreign Application Priority Data

Aug. 6, 1985 [DE] Fed. Rep. of Germany ....... 3528135

[51] Int. Cl.$^4$ .............................................. B64C 21/10
[52] U.S. Cl. .................................... 244/200; 244/130; 138/38
[58] Field of Search .................. 244/130, 200; 138/38, 138/37

[56] References Cited

U.S. PATENT DOCUMENTS

| | | | |
|---|---|---|---|
| 1,903,823 | 4/1933 | Lougheed | 244/200 |
| 4,044,797 | 8/1977 | Fujie et al. | 138/37 |
| 4,180,290 | 12/1979 | Drews | 244/130 |
| 4,650,138 | 3/1987 | Grose | 244/200 |
| 4,706,910 | 11/1987 | Walsh | 244/200 |

FOREIGN PATENT DOCUMENTS

| | | | |
|---|---|---|---|
| 393086 | 12/1908 | France | 244/200 |
| 587211 | 4/1925 | France | 244/200 |
| 104114 | 2/1917 | United Kingdom | 244/200 |
| 324441 | 1/1930 | United Kingdom | 244/200 |

OTHER PUBLICATIONS

NASA Tech. Brief, vol. 5, No. 2, Summer 1980, "Grooves Reduce Air".

Primary Examiner—Galen Barefoot

[57] ABSTRACT

A device for reducing the frictional drag inherent in flow mechanics in airborne, waterborne and space vehicles in which the surface of a body in a flowing medium is provided with an asymmetrical microstructure in the form of grooved profiles whose dimensions do not essentially exceed the average free travel length of the molecules of the medium.

5 Claims, 4 Drawing Sheets

DEVICE FOR REDUCING THE FRICTIONAL DRAG OF MOVING BODIES

BACKGROUND OF THE INVENTION

The present invention is directed to a device for reducing the frictional drag of moving bodies, particularly vehicles, such as airborne, waterborne and space vehicles. The invention is thus concerned with a phenomenon which is inherent in flow mechanics.

The no-slip condition of flow in fluid mechanics indicates that an interface of a flowing medium with the wall of a moving body, flow velocity and wall velocity are identical. As a consequence of the no-slip condition and the viscosity, each body moved through a stationary medium tends to drag along with it a portion of the medium next to it and behind it. As a result, the speed or velocity of the moving body will be slowed down. The frictional drag of airborne and waterborne vehicles is thus a direct consequence of the no-slip condition in flow mechanics.

More than half of the fuel used in aviation is required for overcoming frictional drag. If it were possible to produce a certain slip between the flowing air and the aircraft surface, the frictional drag could be reduced and the economics of aircraft operation would be considerably improved. Relative drag reduction may be expressed in the following formula:

$$\frac{\Delta W_{friction}}{W_{friction}} \simeq 1 - \left( - \frac{V_{slip}}{V_\infty} \right)^2 \tag{1}$$

The adhesion of liquid or gas particles in proximity to the wall of a moving body can be explained by the affinity between the molecules of the flowing medium and the atoms of the wall.

SUMMARY OF THE INVENTION

The present invention is directed toward the task of reducing the frictional drag in moving vehicles inherent in flow mechanics in the sense of an additional fuel saving without the necessity for substantial expenditures, such as would be involved if it were to be required to make changes in the vehicles's overall construction.

Specifically, the invention provides a device, wherein the surface of a body in a flowing medium is provided with an asymmetrical microstructure in the form of a grooved profile whose dimensions do not substantially exceed the average free travel length of the molecules of the medium or the average free travel length of the fluid particles in a turbulent boundary layer.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there are illustrated and described the preferred embodiments of the invention.

DETAILED DESCRIPTION OF THE PREFERRED EMBODIMENTS

As a general principle, it can be stated that every molecule impinging upon the surface of a body is retained there and, after a short dwell time, is emitted with a statistically distributed speed in a statistically distributed direction. In a flat smooth wall or a flat rough wall with a statistically distributed surface inclination, the average mass and momentum flow of the reflected molecules is oriented perpendicularly to the central plane of the wall so that the average speed of the molecules located in proximity to the wall is identical to the wall velocity.

Based on this, the calculation of the wall slip may be set forth as in the following which applies to the limiting case of imperceptibly small profile dimensions as compared to free travel length. Thus, since the general idea of the invention provides that the upper surface of the body is provided with an asymmetrical microstructure, for instance, with fine transverse grooves with a sawtooth profile, the average relative velocity of the reflected particles exhibits a component parallel to the wall because of the asymmetrical emission conditions. In this manner, the no-slip condition of flow mechanics can be partially cancelled. The proposed measure is effective only if the characteristic dimension of the groove profile does not materially exceed the average free travel length of the gas molecules.

Figure 6:
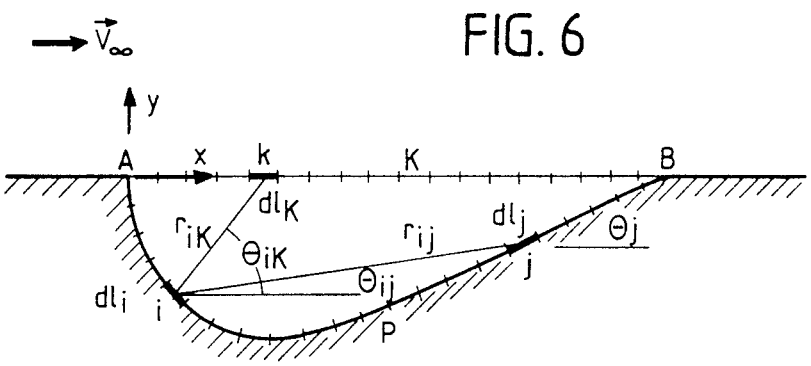
FIG. 6 is a sketch showing the orientation of the Cartesian system of coordinates on which the calculation is based relative to the profile and the velocity vector.

Assuming that a concave cylindrical recess of random shape is located in a flat wall in a longitudinal flow, the sketch illustrated in FIG. 6 shows the orientation of the Cartesian system of coordinates used relative to the profile and to the velocity vector. The designations used are also discernible from this sketch.

The distance AKB and the contour APBV are uniformly subdivided into M and N partial distances, wherein the ratio M/N is selected so that all partial distances are approximately of equal length.

The quantity of molecules $n \bar{c}\, dl_k$ flows per unit time in the direction of the contour APB (n=density of molecules $\bar{c}$=average molecule velocity) past the small k-th partial distance of the contour AKB. The translational velocity $\vec{V}$ has no effect on this result. Since the flight direction of the incoming molecules are isotropically distributed in a reference system moving with $\vec{V}$, the fractional portion $$\frac{1}{\pi} \left[ \frac{dl_i}{r_{ik}} \sin(\theta_{ik} - \theta_i) \right] \left[ \frac{\pi}{2} \sin\left( \theta_{ik} - \frac{V}{c} \sin \theta_{ik} \right) \right] \tag{2}$$

of this molecular flow impinges upon the i-th partial distance of the contour APB. For smaller values of $r_{ik}$, the exact angle $$\arccos \frac{r_1^2 + r_2^2 - dl_i^2}{2 r_1 r_2} \quad (3a)$$

$$r_{1,2} = |\vec{r}_{ik} \pm \vec{dl}_i/2| \quad (3b)$$

must be substituted for the expression in the first square bracket.

The molecule flows which leave the i-th or the j-th contour element are designated by $\dot{m}_i$ and $\dot{n}_j$. It is assumed that the flight directions of the emitted particles are distributed in accordance with the cos-law of Lambert.

The molecule output of the j-th element results at the location of the i-th or k-th element in the molecular flows $$\dot{n}_j \cdot \frac{1}{\pi} \left[ \frac{dl_i}{\theta_{ij}} \sin(\theta_i - \theta_{ij}) \right] \left[ \frac{\pi}{2} |\sin(\theta_1 - \theta_{ij})| \right] \quad (4)$$

and $$\dot{n}_j \cdot \frac{1}{\pi} \left[ \frac{dl_k}{r_{jk}} \sin \theta_{jk} \right] \left[ \frac{\pi}{2} |\sin(\theta_j - \theta_{jk})| \right]$$

respectively.

At smaller values of $r_{ij}$ or $r_{ik}$ $$\arccos = \frac{r_1^2 + r_2^2 - dl_{i,k}^2}{2 r_1 r_2} \quad (5a)$$

must be substituted for the expressions in the first square bracket, wherein $r_{1,2}$ in this case is given by $$r_{1,2} = |\vec{r}_{ij} \text{ or } \vec{r}_{ik} \pm \vec{dl}_i \text{ or } \vec{dl}_k| \quad (5b)$$

One obtains in case of stationary flow for the i-th contour element from the conservation theorem for the quantity of molecules $$\dot{n} = \frac{n \bar{c} \, dl_i}{2} \sum_{k=1}^{M} \frac{dl_k}{\pi r_{ik}} \sin(\theta_{ik} - \theta_i) \cdot \quad (6)$$

$$\frac{\pi}{2} \left| \sin \left( \theta_{ik} - \frac{v}{\bar{c}} \sin \theta_{ik} \right) \right| +$$

$$\sum_{j=1}^{N} \dot{n}_j \frac{dl_i}{\pi r_{ik}} \sin(\theta_i - \theta_{ij}) \cdot \frac{\pi}{2} |\sin(\theta_j - \theta_{ij})|_{i=1,2,\ldots N}$$

wherein the case i=j has to be excluded in the second summation.

The relationship (6) represents a linear system of equations for the N unknown molecule yields $\dot{n}_j$. After said system of equations has been solved, there may be obtained normal and tangential components of the molecular flow flowing out of the contour AKB as $$\dot{n}_\perp = \sum_{k=1}^{M} \sum_{i=1}^{N} n_i \frac{dl_k}{\pi r_{ik}} \sin^2 \theta_{ik} \cdot \frac{\pi}{2} |\sin(\theta_i - \theta_{ik})| \quad (7)$$

-continued $$\dot{n}_\parallel = \sum_{1}^{M} \sum_{1}^{N} n_i \frac{dl_k}{\pi r_{ik}} \sin \theta_{ik} \cos \theta_{ik} \frac{\pi}{2} |\sin(\theta_i - \theta_{ik})|$$

For the average tangential velocity of the emitted molecules, there may be obtained $$V_{slip}(V) = \frac{\dot{n}_\parallel}{\dot{n}_\perp} \bar{c} \quad (8)$$

The slip velocity is calculated in accordance with the following iterative schematic $$V_{slip(n+1)} = V_{slip}(V = V_{slip(n)}) \quad (9)$$

whereby in the first step V is made to equal 0. Because of $\partial V_{slip}/\partial V \ll 1$, the process in general requires only two iterative steps.

(As a rule $V_{slip} \simeq 0.96 \, V_{slip1}$).

First of all, the triangular prismatic profile with a vertical flank and an inclined ramp is explored. In this configuration, the emission of the molecules of the flank acts in the sense of a positive slip speed, while the emission of the ramp acts in the opposite sense. As the following results show, the influence of the vertical flank is preponderant.

Figure 1:
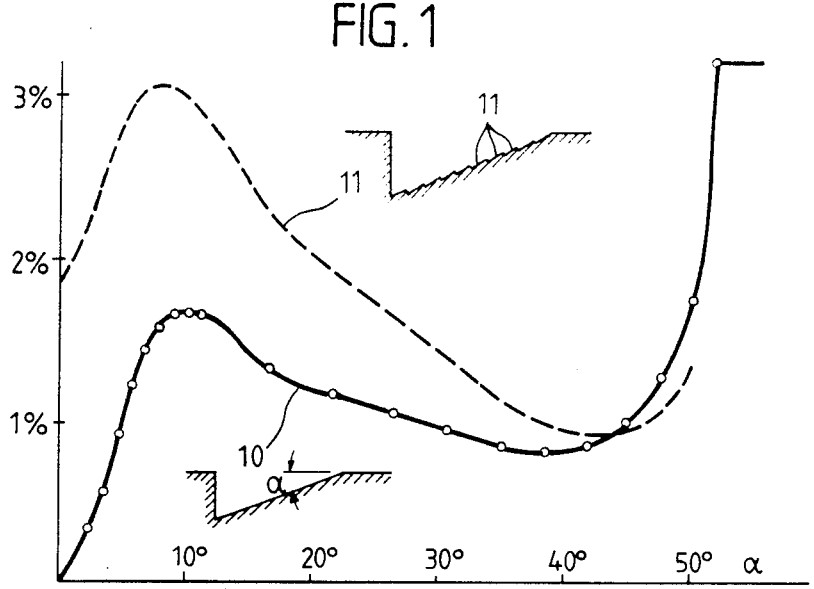
FIG. 1 is a graph showing the relationship of the slip speed to the average thermal molecular speed c as a function of the angle of inclination of the ramp ($\alpha$)

FIG. 1 shows the relationship of the slip speed to the average thermal molecular velocity $\bar{c}$ as a function of the angle of inclination of the ramp, $\alpha$ of the asymmetrical microstructure 10. In these calculations M=N=50. It will be seen that the slip speed increases steeply with increasing angle $\alpha$, reaches a maximum value of 1.7% $\bar{c}$ at $\alpha = 10°$, then decreases again to 0.83% $\bar{c}$, in order to subsequently increase again. The steep rise above $\alpha = 50°$ is traceable to the circumstance that in this angular range, very high particle densities are generated in the vicinity of the inner profile corner, which result in a powerful molecular flow in the direction of the line bisecting the angle. At $\alpha = 52.1°$, the molecular density in the corner becomes singular. There, $V_{slip}$ reaches a value of 3.25% $\bar{c}$.

At this point, it should be stated that the digital simulation of the motion of a molecule between a flat wall and a neighboring wall with a sawtooth profile results in similar drift velocities. Because of a pronounced statistical fluctuation of the results, the digital simulation can however only supply approximate values for the slip speed.

Figure 2:
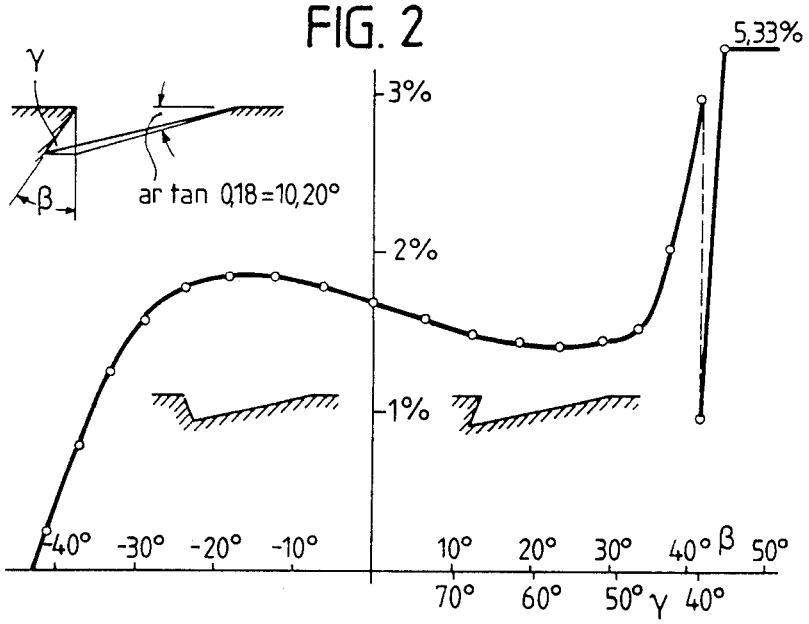
FIG. 2 is a graph depicting the effects of the angle of inclination $\beta$ of the short side of a triangular profile on the slip speed.

FIG. 2 shows the effect of the angle of inclination of the short side of the triangular profile on the slip speed at an average ramp angle of $\alpha = 10.2°$. As is seen, the slip can be slightly increased to 1.85% $\bar{c}$ by increasing the angle between the two surfaces. More interesting is the change of inclination in the opposite direction. With increased convergence of the inner corner, the slip at first slightly decreases, then, however, rises steeply when the corner angle approaches a value of 35°. In this angular range, there occurs a strong interaction between the two sides adjacent the inner corner which entails a powerful increase in the local emission flows. The molecules leave the narrow corner in the shape of a relatively tightly bunched beam directed downstream which supplies a considerable contribution to $V_{slip}$.

A detailed investigation of the angular range around 35° shows that the particle density in the corner becomes singular at a corner angle of 36.7°. This angle results in a slip of 5.33% $\bar{c}$. For more acute angles, there exists no steady solution for the present flow problem. There occurs a continuous flow of molecules in the direction of the narrow corner which finally leads to an effective rounding off of the corner. In this manner, each sharp corner which exhibits an angle of less than 36.7° is automatically rounded off. The magnitude of the slip velocity in this angular range is not clear. It should, however, not materially differ from the limit value of 5.33% $\bar{c}$.

The effectiveness of the asymmetrical triangular profile can be increased by providing the ramp with a series of asymmetrical triangular grooves as subgrooves 11. This achieves a slight rotation of the average direction of emission of the molecules. The curve in broken lines in FIG. 1 shows the slip realizable with this measure. The subgrooves 11 are shaped in such a way that, viewed in an isolated manner, they would generate a slip of 1.85% $\bar{c}$. This corresponds to an angular rotation of 2.1°.

FIG. 1 shows that the effects of the large and the small grooves are nearly additive in case of very small ramp angles. At larger angles, this additive value is not reached. If one combines FIG. 1 with FIG. 2, it is seen that a slip of 3.2% $\bar{c}$ can be achieved with a two-stage asymmetrical triangular profile without the reinforcing effect of undercut corners being added in this case.

The following investigation is made for two values of the slip speed. The value 3.2% $\bar{c}$ corresponds to the uncomplicated two-stage triangular profile. The second value of 5.3% $\bar{c}$ applies to the single stage profile with an acute inner corner.

The following relationship exists between the speed of sound for a biatomic gas, a, and the average molecular velocity $\bar{c}$ $$c = \sqrt{40/7\pi} a = 1.349a \tag{10}$$

Thus, the slip speed amounts to $$V_{slip} = 0.0432a \text{ or } 0.0715a \tag{11}$$

For a flat plate in a flow with a longitudinal velocity of $V_\infty$, the drag reduction, because of slip, can be approximately calculated according to equation (1). If one substitutes $M_\infty a$ for $V_\infty$ and the expressions (11) for $V_{slip}$, then one obtains $$\frac{\Delta W}{W} = 1 - \left(1 - \frac{0.0432 \text{ or } 0.0715}{M_\infty}\right)^2 \tag{12}$$

Figure 3:
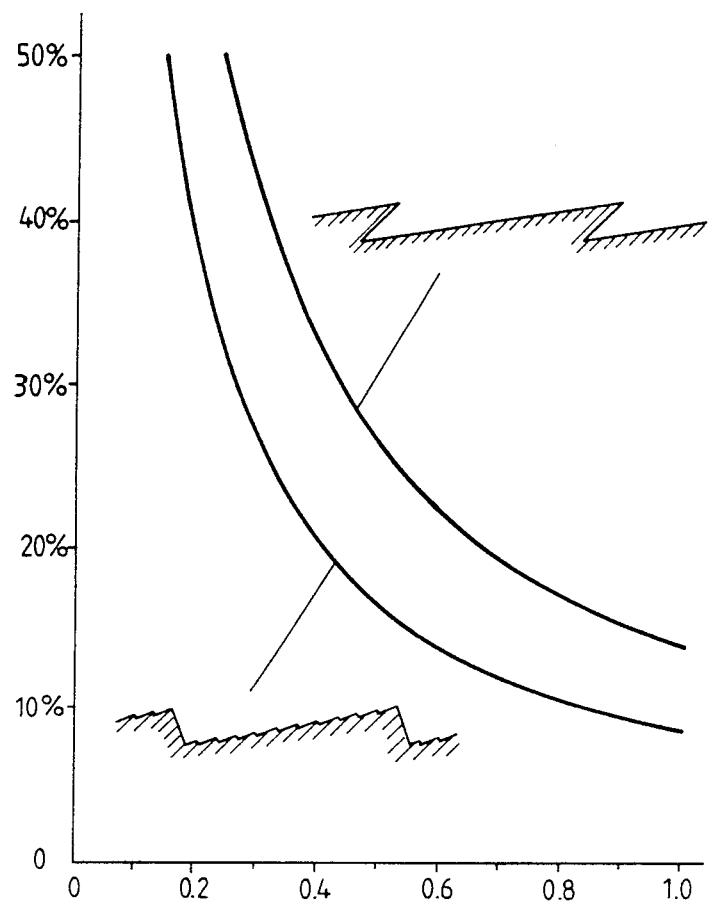
FIG. 3 is a graph showing the variation of the relative drag reduction with $M_\infty$.
Figure 4A:
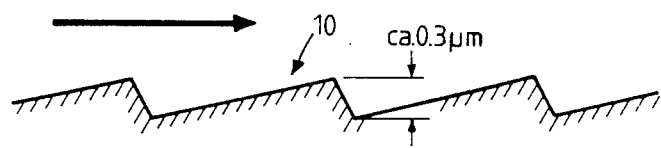
FIGS. 4a–4c are sectional views of embodiments of microscopic microstructures of a vehicle surface.
Figure 4B:
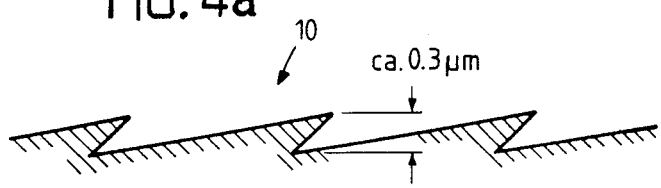
Figure 4C:
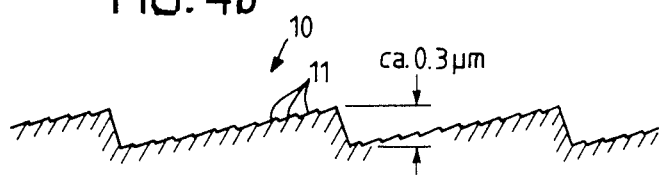
Figure 5A:
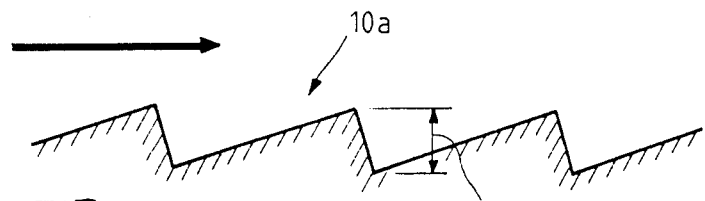
FIGS. 5a and 5b are sectional views of embodiments of macroscopic microstructuring of a vehicle surface.
Figure 5B:
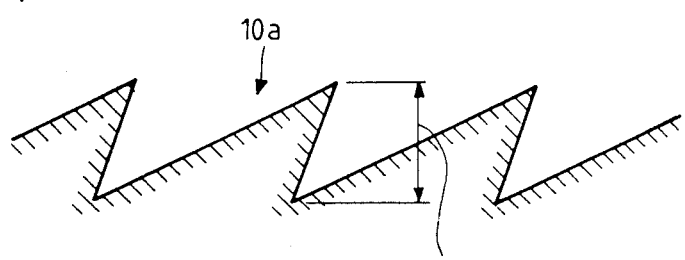

FIG. 3 shows the variation of the relative drag reduction with $M_\infty$. At a flight mach number of 0.85, the frictional drag can be reduced by 9.9% or 16.1%.

The concept of the asymmetrical microstructuring of the vehicle surface is fully effective then only if the depth of the grooves does not exceed the average free travel length of the air molecules. At a flight altitude of 11 km, the average free travel length amounts to about 0.3μm. This means that the dimension of the triangular groove should amount to approximately 0.3μ×1.5μ. Such a microstructure can be produced mechanically as well as photographically. (For comparison purposes: in the fabrication of diffraction grids, grooves wth dimensions of 0.1μ×1.5μ×0.8μ are produced with a profile accuracy of 0.03μ. In optical apparatus, the surface quality amounts to 0.03μ.) Subgrooves 11 of the magnitude 0.05μ×0.25μ are producible with methods used in semiconductor technology or with electron beams.

Grooves with undercut flanks can also be produced by plastic deformation of triangular grooves with vertical flanks.

For cost reasons, asymmetrical microstructures are above all used in those areas of aircraft where there is involved either a thin boundary layer with high frictional coefficients or high local velocities. These are the front 60% of the wing upper surface, the front 40% of the control surfaces as well as the front 30% of the fuselage surface.

The proposed concept is particularly effective in the area of the wing upper surface in view of the high drag augmentation factor in this area. The values of the relative drag reduction shown in FIG. 3 for M=0.85 increase in the case of a wing upper surface to 15% and 24% respectively in spite of the supersonic mach number existing there. In cruising flight, the front 60% of the wing upper surface is responsible for approximately 25% of the entire frictional drag of the aircraft, in spite of the fact that it provides only about 12% of the wetted surface. This means that, by treatment of only 12% of the aircraft surface, frictional drag of a transport aircraft can be reduced by 3.8% or 6%. If the flowing medium is a liquid, it is not possible to produce a slip with the help of microscopic surface structures because of the high packing density of the molecules. In this case, it is proposed to perform the generation of a velocity slip with the help of macroscopic asymmetrical surface microstructures 10a.

In a manner similar to that whereby the size of the microscopic grooves is dependent upon the free travel length of the gas molecules, the dimensions of macroscopic structures will be selected in relation to the mixing length. The mixing length averaged over the thickness of the boundary layer lies at about 10% of the boundary layer thickness. The boundary layer thickness increases according to $$\frac{d}{l} \sim (Re)^{-0.2} \cdot (x/l)^{0.8}$$

wherein x designates the distance from the front stagnation point and l length of the body. Thus, the characteristic profile dimensions should increase proportionally to $$(x/l)^{0.8} \cdot Re^{0.2}$$

The constant of proportionality and the most favorable profile shapes must be determined experimentally.

Since the macroscopic process of turbulence occurs in gases as well as in liquids, macroscopic asymmetrical surface structures are utilizable in airborne as well as in waterborne vehicles.

On the subject of production and development of the asymmetrical microstructures 10, 10a, it can be stated that the macroscopic microstructure 10a can also be executed to be scale or flake shaped, therefore, three-dimensional.

Furthermore, it has to be emphasized that every deviation from the emission law of Lambert in the direction of an isotropic distribution increases the effectiveness of the asymmetrical structure. The reflection in the tangential direction can be increased by truncated cones distributed stochastically or in a random way on the surface.

The proposed sawtooth structure can be applied to the surface in various ways. For one, in the form of a foil which can be glued on or through embossing into the soft wing skin or by a lacquer layer prior to hardening. Sawtooth structures with strongly converging recesses can be produced by the deformation of conventional sawtooth profiles. Fabrication of the structures by means of laser or x-ray lithography is also possible. A further fabrication mode exists by asymmetrical sand blasting. For special requirements, an asymmetrical microstructure can also be advantageously applied by a fiber fleece with the fibers being oriented downstream and, in order to be sure that the effectiveness of all the microstructures enumerated is also retained in rainy weather, it is advisable to impregnate the entire surface of the structure with a water repelling preparation.

While specific embodiments of the invention have been shown and described in detail to illustrate the application of the inventive principles, it will be understood that the invention may be embodied otherwise without departing from such principles.

What is claimed is:

1. In a device for reduction of the frictional drag inherent in flow mechanics in bodies moving through a fluid medium in a given direction, such as airborne, waterborne and space vehicles, the improvement comprising that the surface of the moving body is provided with an asymmetrical microstructure in the form of grooved profiles extending transversely to said given direction whose depths do not substantially exceed the average free travel length of the molecules of the medium or the average free travel length of the fluid particles of the turbulent boundary layer, and lie in the region of micrometers.

2. A device according to claim 1, wherein said asymmetrical microstructure is constructed microscopically for influencing the average direction of emission of the molecules.

3. A device according to claim 1, wherein the grooved profile of the asymmetrical microscopic microstructure is additionally provided with asymmetrical subgrooves.

4. A device according to claim 1, wherein the grooved profile of the asymmetrical microscopic microstructure exhibits a three-dimensional design.

5. A device according to claim 2, wherein the grooved profile of the asymmetrical microscopic microstructure is additionally provided with asymmetrical subgrooves.

* * * * *